(12) United States Patent
Lee et al.

(10) Patent No.: US 10,602,499 B2
(45) Date of Patent: *Mar. 24, 2020

(54) METHOD AND APPARATUS FOR RECEIVING OR TRANSMITTING DOWNLINK CONTROL SIGNAL IN WIRELESS COMMUNICATION SYSTEM

(71) Applicant: LG ELECTRONICS INC., Seoul (KR)

(72) Inventors: Jihyun Lee, Anyang-si (KR); Seungmin Lee, Anyang-si (KR); Hakseong Kim, Anyang-si (KR); Hanbyul Seo, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

This patent is subject to a terminal disclaimer.

(21) Appl. No.: 15/874,736

(22) Filed: Jan. 18, 2018

(65) Prior Publication Data

US 2018/0146460 A1 May 24, 2018

Related U.S. Application Data

(63) Continuation of application No. 14/434,378, filed as application No. PCT/KR2013/009282 on Oct. 17, 2013, now Pat. No. 9,913,261.
(Continued)

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04W 72/0446* (2013.01)

(58) Field of Classification Search
CPC ............... H04W 72/042; H04W 28/20; H04W 72/0446; H04W 72/0406; H04W 72/12;
(Continued)

(56) References Cited

U.S. PATENT DOCUMENTS 9,281,922 B2 3/2016 Malkamaki et al.
2009/0245194 A1 10/2009 Damnjanovic et al.
(Continued)

FOREIGN PATENT DOCUMENTS

CN 102624489 8/2012
EP 2654358 10/2013
(Continued)

OTHER PUBLICATIONS

European Patent Office Application Serial No. 13846435.9, Search Report dated Jun. 16, 2016, 9 pages.
(Continued)

*Primary Examiner* — Paul H Masur
*Assistant Examiner* — Michael K Phillips
(74) *Attorney, Agent, or Firm* — Lee Hong Degerman Kang & Waimey

(57) ABSTRACT

Provided is a method for receiving a downlink signal by a user equipment (UE) in a wireless communication system according to one embodiment of the present disclosure, comprising: receiving a plurality of parameter sets for Semi Persistent Scheduling (SPS)-physical downlink shared channel (PDSCH) through higher layer signaling; receiving a downlink control information (DCI) configuring the SPS-PDSCH; and decoding the SPS-PDSCH using one of the received plurality of parameter sets, wherein the parameter set to be used for decoding is determined based on whether an indicator indicating the parameter set to be used for decoding is included in the DCI.

20 Claims, 10 Drawing Sheets

Related U.S. Application Data

(60) Provisional application No. 61/715,316, filed on Oct. 18, 2012, provisional application No. 61/723,748, filed on Nov. 7, 2012, provisional application No. 61/727,107, filed on Nov. 15, 2012.

(58) Field of Classification Search
CPC .... H04W 28/18; H04W 72/1289; H04L 5/0053; H04L 1/1861; H04J 11/00
See application file for complete search history.

(56) References Cited

U.S. PATENT DOCUMENTS

| | | | |
|---|---|---|---|
| 2011/0223924 A1 | 9/2011 | Lohr et al. | |
| 2011/0239072 A1 | 9/2011 | Cai | |
| 2013/0039291 A1* | 2/2013 | Blankenship | H04L 5/001 370/329 |
| 2013/0094458 A1* | 4/2013 | Sartori | H04W 72/042 370/329 |
| 2013/0114419 A1* | 5/2013 | Chen | H04L 5/0053 370/248 |
| 2013/0183987 A1* | 7/2013 | Vrzic | H04L 5/0053 455/450 |
| 2013/0242947 A1* | 9/2013 | Chen | H04W 72/04 370/335 |
| 2013/0294247 A1 | 11/2013 | Zhu et al. | |
| 2013/0315113 A1 | 11/2013 | Seo et al. | |
| 2014/0056244 A1* | 2/2014 | Frenne | H04L 5/0053 370/329 |
| 2014/0056278 A1 | 2/2014 | Marinier et al. | |
| 2014/0071935 A1 | 3/2014 | Papasakellariou et al. | |
| 2014/0092829 A1 | 4/2014 | Han et al. | |
| 2014/0098689 A1 | 4/2014 | Lee et al. | |
| 2014/0105164 A1 | 4/2014 | Moulsley et al. | |
| 2014/0119266 A1* | 5/2014 | Ng | H04L 1/0061 370/312 |
| 2014/0247775 A1 | 9/2014 | Frenne et al. | |
| 2015/0148050 A1 | 5/2015 | Siomina et al. | |
| 2015/0249974 A1 | 9/2015 | Lee et al. | |
| 2015/0282134 A1* | 10/2015 | Suzuki | H04L 5/0044 370/329 |

FOREIGN PATENT DOCUMENTS

| | | |
|---|---|---|
| JP | 2011-244198 | 12/2011 |
| WO | 2011085192 | 7/2011 |
| WO | 2012/079517 | 6/2012 |
| WO | 2012/086932 | 6/2012 |
| WO | 2012079517 | 6/2012 |
| WO | 2012/108679 | 8/2012 |
| WO | 2012/109542 | 8/2012 |

OTHER PUBLICATIONS

Panasonic, "EPDCCH starting symbol," 3GPP TSG RAN WG1 Meeting #70bis, R1-124239, Oct. 2012, 3 pages.
Zte, et al., "Way Forward on downlink control signalling for PDSCH RE mapping and quasi-co-location of CSI-RS and DMRS for TM10," 3GPP TSG RAN WG1 #70bis, R1-124623, Oct. 2012, 5 pages.
Pantech, "Downlink control signaling for PDSCH RE mapping of DL CoMP," 3GPP TSG RAN WG1 Meeting #70bis, R1-124304, Oct. 2012, 4 pages.
NEC Group, "On PDSCH RE mapping in CoMP," 3GPP TSG RAN WG1 Meeting #70bis, R1-124295, Oct. 2012, 7 pages.
PCT International Application No. PCT/KR2013/009282 Written Opinion of the International Searching Authority dated Jan. 28, 2014, 16 pages.
U.S. Appl. No. 14/434,378, Office Action dated May 19, 2016, 46 pages.
Zhu et al., "Resource Scheduling Method, Apparatus, and Base Station", WO, WO 2012/079517, machine translation, Jun. 2012, 17 pages.
Samsung, "EPDCCH Starting Subframe Symbol," 3GPP TSG RAN WG1 #70bis, R1-124379, Oct. 2012, 2 pages.
Alcatel-Lucent (Rapporteur), "Updated RRC parameters for EPDCCH," 3GPP TSG RAN WG1 Meeting #70bis, R1-124671, Oct. 2012, 5 pages.
LG Electronics, "Remaining details on EPDCCH resource configuration," 3GPP TSG RAN WG1 Meeting #71, R1-124983, Nov. 2012, 4 pages.
Samsung, "EPDCCH Starting Symbol," 3GPP TSG RAN WG1 #71, R1-124924, Nov. 2012, 2 pages.
Ericsson, et al., "ePDCCH start symbol," 3GPP TSG-RAN WG1 #71, R1-124894, Nov. 2012, 3 pages.
State Intellectual Property Office of the People's Republic of China Application Serial No. 201380054722.9, Office Action dated Mar. 20, 2017, 22 pages.
U.S. Appl. No. 14/434,378, Final Office Action dated Nov. 4, 2016, 34 pages.

* cited by examiner

FIG. 9
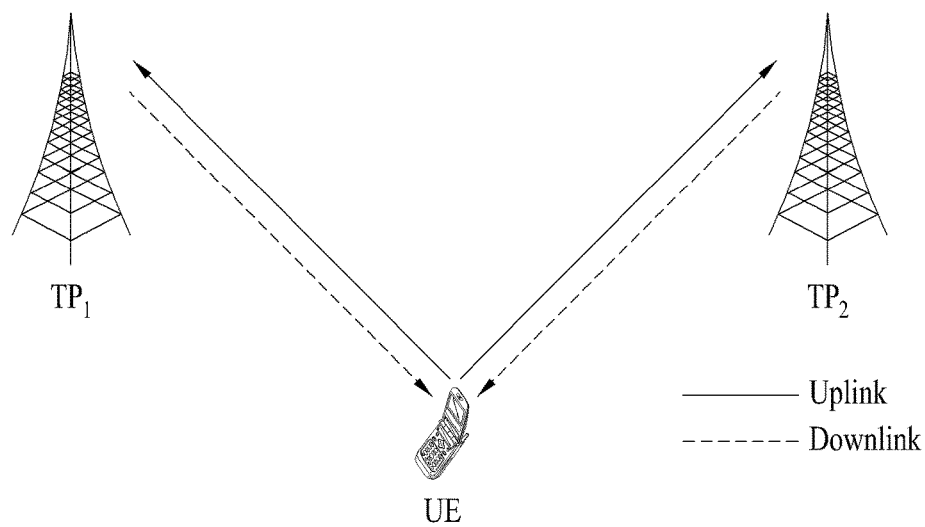
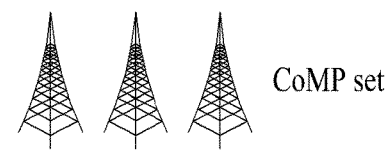
FIG. 10
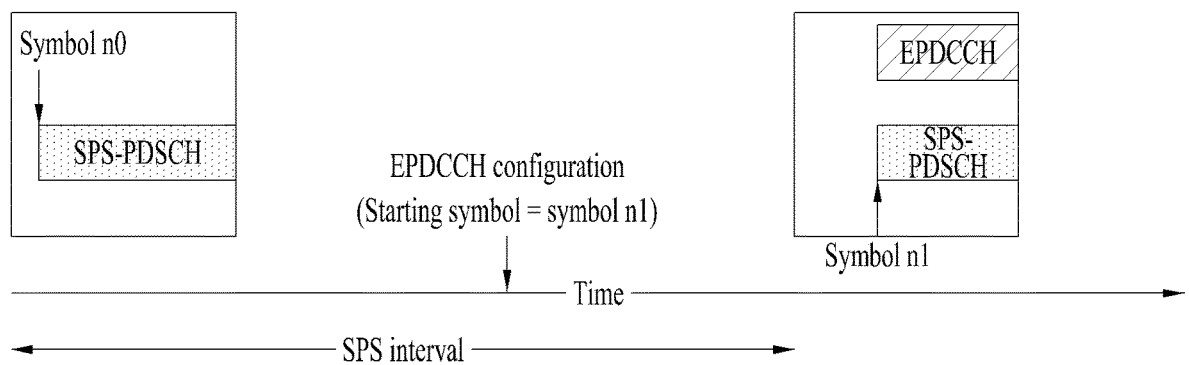

METHOD AND APPARATUS FOR RECEIVING OR TRANSMITTING DOWNLINK CONTROL SIGNAL IN WIRELESS COMMUNICATION SYSTEM

CROSS-REFERENCE TO RELATED APPLICATIONS

This application is a continuation of U.S. patent application Ser. No. 14/434,378, filed on Apr. 8, 2015, now U.S. Pat. No. 9,913,261, which is the National Stage filing under 35 U.S.C. 371 of International Application No. PCT/KR2013/009282, filed on Oct. 17, 2013, which claims the benefit of U.S. Provisional Application No. 61/715,316, filed on Oct. 18, 2012, 61/723,748, filed on Nov. 7, 2012 and 61/727,107, filed Nov. 15, 2012, the contents of which are all hereby incorporated by reference herein in their entirety.

TECHNICAL FIELD

The present invention relates to a wireless communication system, and more particularly to a method and apparatus for receiving or transmitting a downlink control signal in a wireless communication system.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for receiving or transmitting downlink control information in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The objects of the present invention can be achieved by providing a method for receiving a downlink signal by a user equipment (UE) in a wireless communication system including: receiving Semi Persistent Scheduling (SPS)—related control information through higher layer signaling or a downlink control channel; and decoding a semi-persistently-scheduled downlink data channel based on the SPS-related control information, wherein the method further includes: if downlink control information (DCI) received through the downlink control channel is a first downlink control information (DCI) format, decoding the downlink data channel using a first parameter set from among candidate parameter sets received through higher layer signaling; and if downlink control information (DCI) received through the downlink control channel is a second DCI format, decoding the downlink data channel by using a second parameter set indicated by the downlink control information from among the candidate parameter sets received through higher layer signaling.

Additionally or alternatively, each of the candidate parameter sets may include information regarding a starting symbol position of the downlink data channel.

Additionally or alternatively, each of the candidate parameter sets may include resource element (RE) mapping pattern information related to specific reference signal(s).

Additionally or alternatively, if the semi-persistently-scheduled downlink data channel is received in a MBSFN (Multimedia Broadcast multicast service Single Frequency Network) subframe, a starting symbol position of the downlink data channel may be restricted to a starting symbol position of a downlink data channel of the MBSFN subframe.

Additionally or alternatively, the user equipment (UE) may be configured in transmission mode 10.

Additionally or alternatively, the user equipment (UE) may be configured to receive downlink signal from at least two eNBs.

Additionally or alternatively, the method may further include decoding the downlink data channel by using the first parameter set or the second parameter set until new SPS-related information is received.

In accordance with another aspect of the present invention, a user equipment (UE) for receiving a downlink control signal in a wireless communication system includes: a radio frequency (RF) unit; and a processor configured to control the RF unit, wherein the processor receives Semi Persistent Scheduling (SPS)—related control information through higher layer signaling or a downlink control channel, and decodes a semi-persistently-scheduled downlink data channel based on the SPS-related control information, wherein, if downlink control information (DCI) received through the downlink control channel is a first downlink control information (DCI) format, the processor is further configured to decode the downlink data channel by using a first parameter set from among candidate parameter sets received through higher layer signaling; and, if downlink control information (DCI) received through the downlink control channel is a second DCI format, the processor is further configured to decode the downlink data channel by using a second parameter set indicated by the downlink control information from among the candidate parameter sets received through higher layer signaling.

Additionally or alternatively, each of the candidate parameter sets may include information regarding a starting symbol position of the downlink data channel.

Additionally or alternatively, each of the candidate parameter sets may include resource element (RE) mapping pattern information related to specific reference signal(s).

Additionally or alternatively, if the semi-persistently-scheduled downlink data channel is received in a MBSFN (Multimedia Broadcast multicast service Single Frequency Network) subframe, a starting symbol position of the downlink data channel may be restricted to a starting symbol position of a downlink data channel of the MBSFN subframe.

Additionally or alternatively, the user equipment (UE) may be configured in transmission mode 10.

Additionally or alternatively, the user equipment (UE) may be configured to receive downlink signal from at least two eNBs.

Additionally or alternatively, the processor may be configured to decode the downlink data channel by using the first parameter set or the second parameter set until new SPS-related information is received.

It is to be understood that both the foregoing general description and the following detailed description of the present invention are exemplary and explanatory and are intended to provide further explanation of the invention as claimed.

Advantageous Effects

According to exemplary embodiments of the present invention, the present invention can efficiently transmit and receive downlink control information in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 9 is a conceptual diagram illustrating a wireless communication system for enabling a UE to receive a Joint Transmission (JT) service from a CoMP aggregation.

FIG. 10 is a conceptual diagram illustrating a method for deciding the start symbol position of the SPS-scheduled PDSCH (hereinafter referred to as SPS-PDSCH) according to the above mentioned embodiment.

BEST MODE

Figure 1:
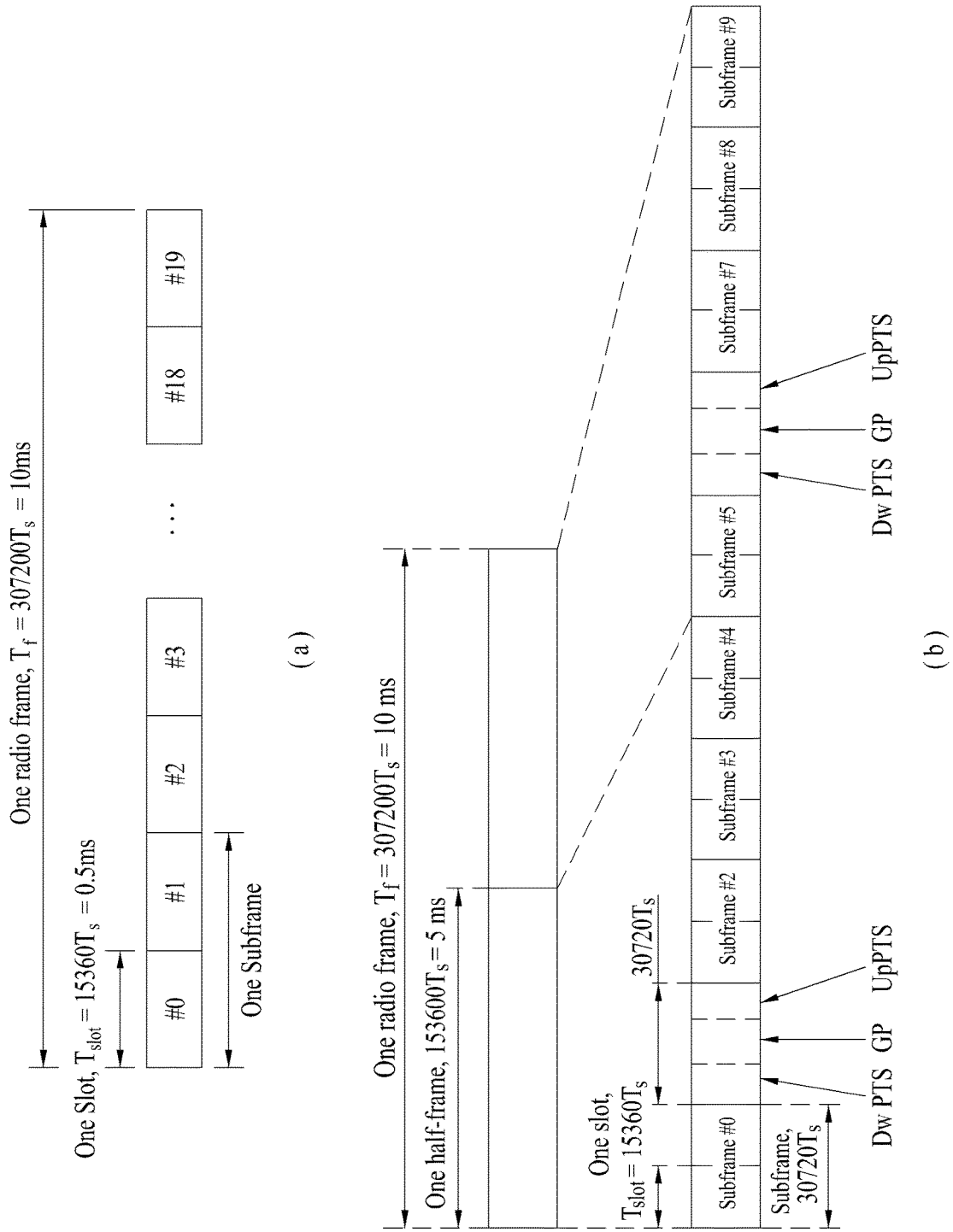
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals)

transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |

Figure 2:
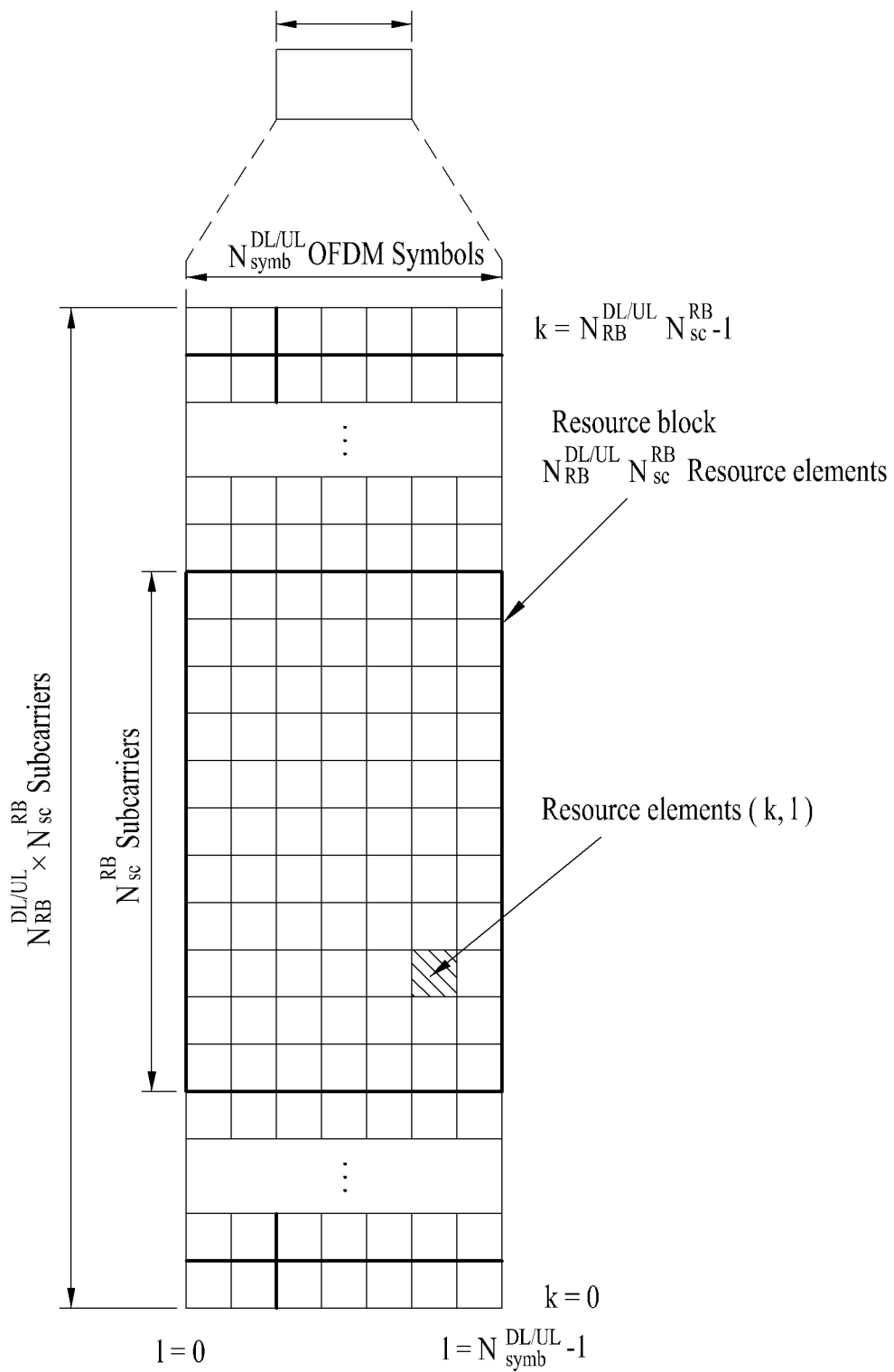
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ frequency domain and 1 is an index in the range of 0 to $N_{symb}^{DL/UL} - 1$.

Two RBs, which occupy $N_{sc}^{RB}$ same continuous subcarriers for one subframe and are respectively located at two slots of the subframe, will be referred to as a pair of physical resource blocks (PRB). The two RBs constituting the PRB have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to NDLVRB−1, and NDLVRB=NDLRB is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
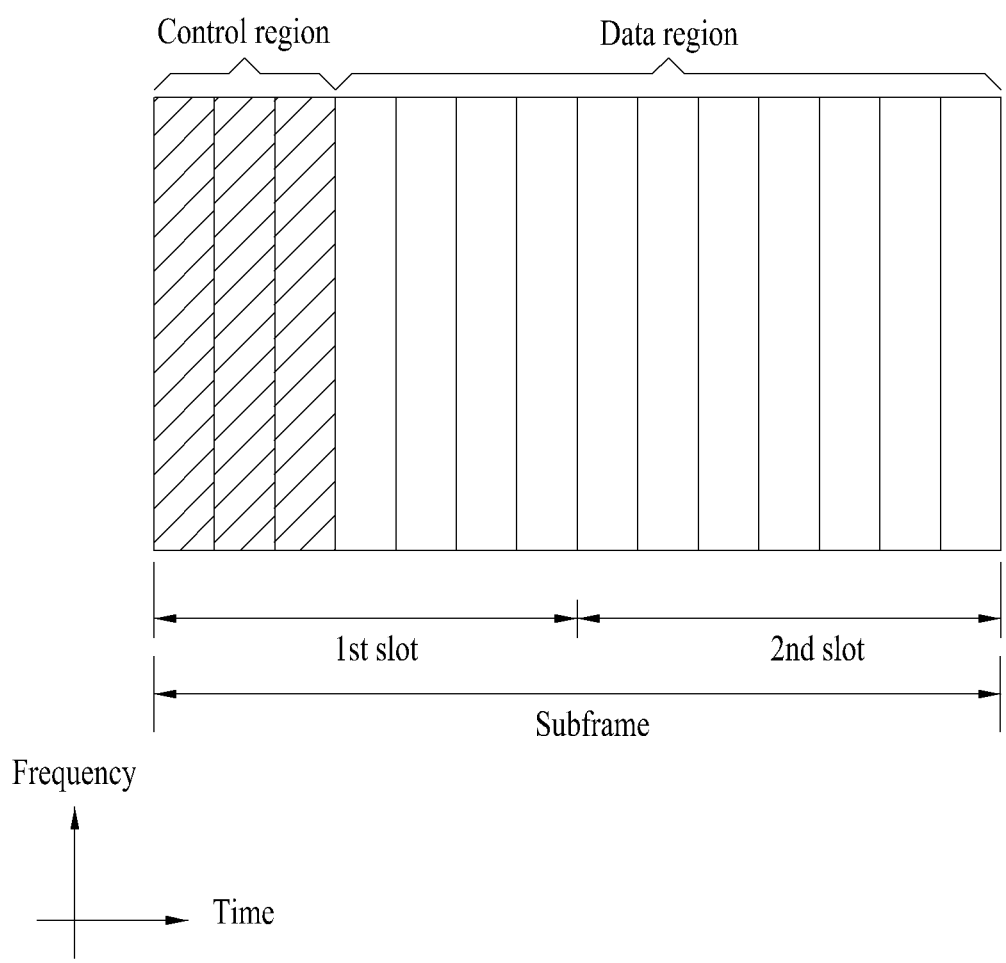
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. The aggregation levels defining the search space are indicated as follows:

TABLE 3

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
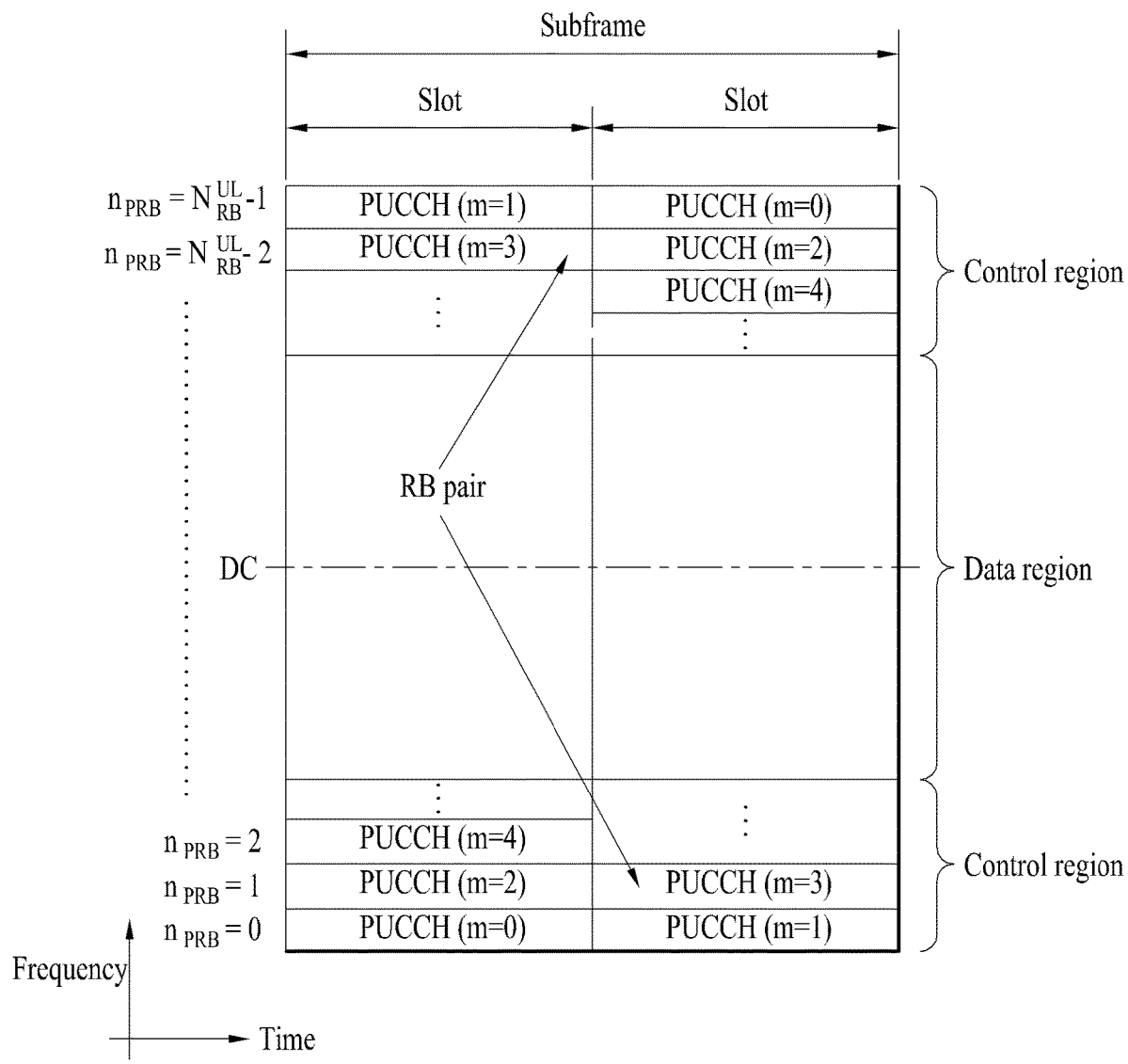
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.
  Scheduling Request (SR): This is information used to request a UL-SCH resource and is transmitted using On-Off Keying (OOK) scheme.
  HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.
  Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

General EPDCCH (Enhanced PDCCH)

Owing to introduction of a multi-node system, although various communication schemes becomes available in a manner that channel quality improvement is achieved, introduction of a new control channel is being requested to apply the above-mentioned MIMO scheme and inter-cell coordinated communication scheme to the multi-node environment. Due to the above necessity, introduction of a new control channel is an Enhanced PDCCH (EPDCCH) is being intensively discussed, and the new control channel can be allocated to a data region (hereinafter referred to as a PDSCH region) instead of the legacy control region (hereinafter referred to as a PDCCH region). As a result, node control information can be transmitted per UE through EPDCCH, such that the problem of insufficiency of the legacy PDCCH region can also be solved. For reference, EPDCCH is not applied to the legacy UE, and can be received by the LTE-A UE only.

Figure 5:
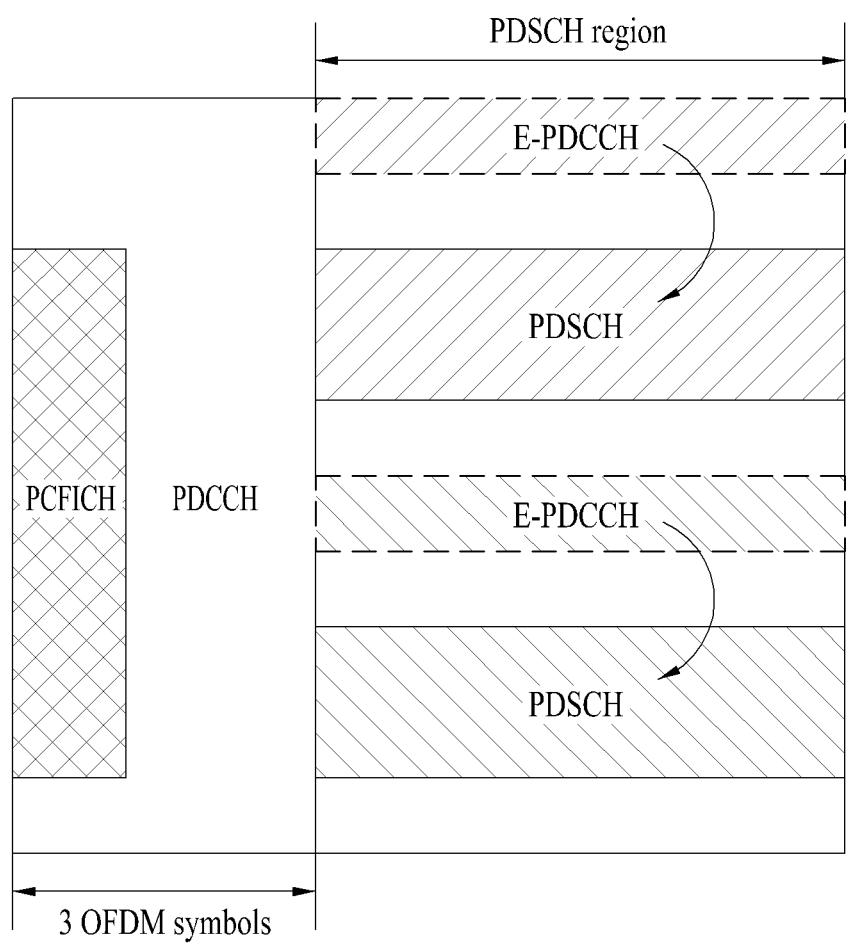
FIG. 5 exemplarily shows an EPDCCH (Enhanced Physical Downlink Control Channel).

FIG. 5 is a conceptual diagram illustrating a carrier aggregation (CA) scheme.

Referring to FIG. 5, EPDCCH may define and use some parts of the PDSCH region configured to transmit data, and the UE has to perform blind decoding for detecting the presence or absence of EPDCCH. EPDCCH performs the same scheduling operation (i.e., PDSCH, PUSCH control) as in the legacy PDCCH. If the number of UEs connected to the same node as in RRH increases, many more EPDCCHs are allocated to the PDSCH region, such that the number of blind decoding times to be executed by the UE increases, resulting in increased complexity.

Meanwhile, a method for multiplexing EPDCCH for a plurality of UEs needs to be considered. In more detail, according to the multiplexing scheme proposed by the present invention, on the condition that a common resource region (i.e., a common PRB set) is configured, EPDCCHs of multiple UEs can be cross-interleaved to the frequency domain or the time domain.

Figure 6:
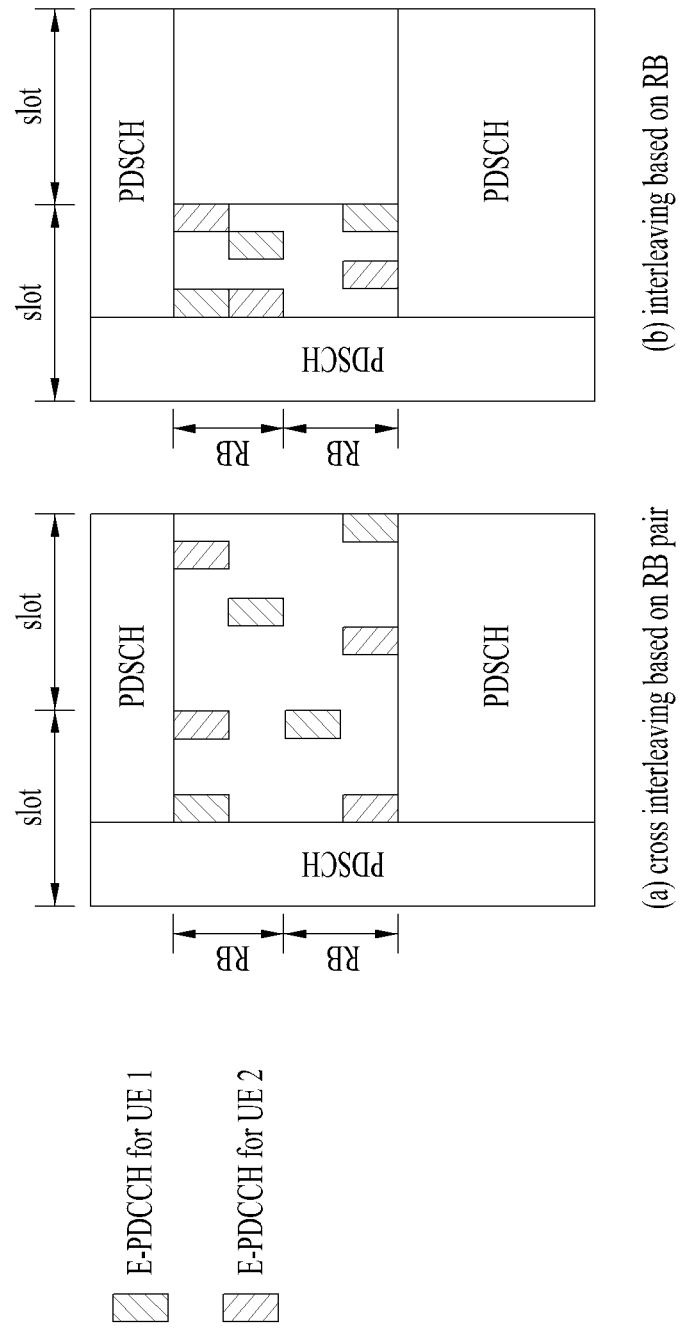
FIG. 6 exemplarily shows an EPDCCH (Enhanced Physical Downlink Control Channel).

FIG. 6 is a conceptual diagram illustrating a method for multiplexing EPDCCH for a plurality of UEs.

Specifically, FIG. 6(a) shows an example in which a common PRB set is configured on the basis of a PRB pair and cross increasing is performed on the basis of the common PRB set. In contrast, FIG. 6(b) shows another example in which a common PRB set is configured on a basis of a PRB and cross interleaving is performed on the basis of the common PRB set. The schemes of FIGS. 6(a) and 6(b) have advantages in which a diversity gain of the time/frequency domains extending a plurality of RBs can be obtained.

Carrier Aggregation (CA)

Figure 7:
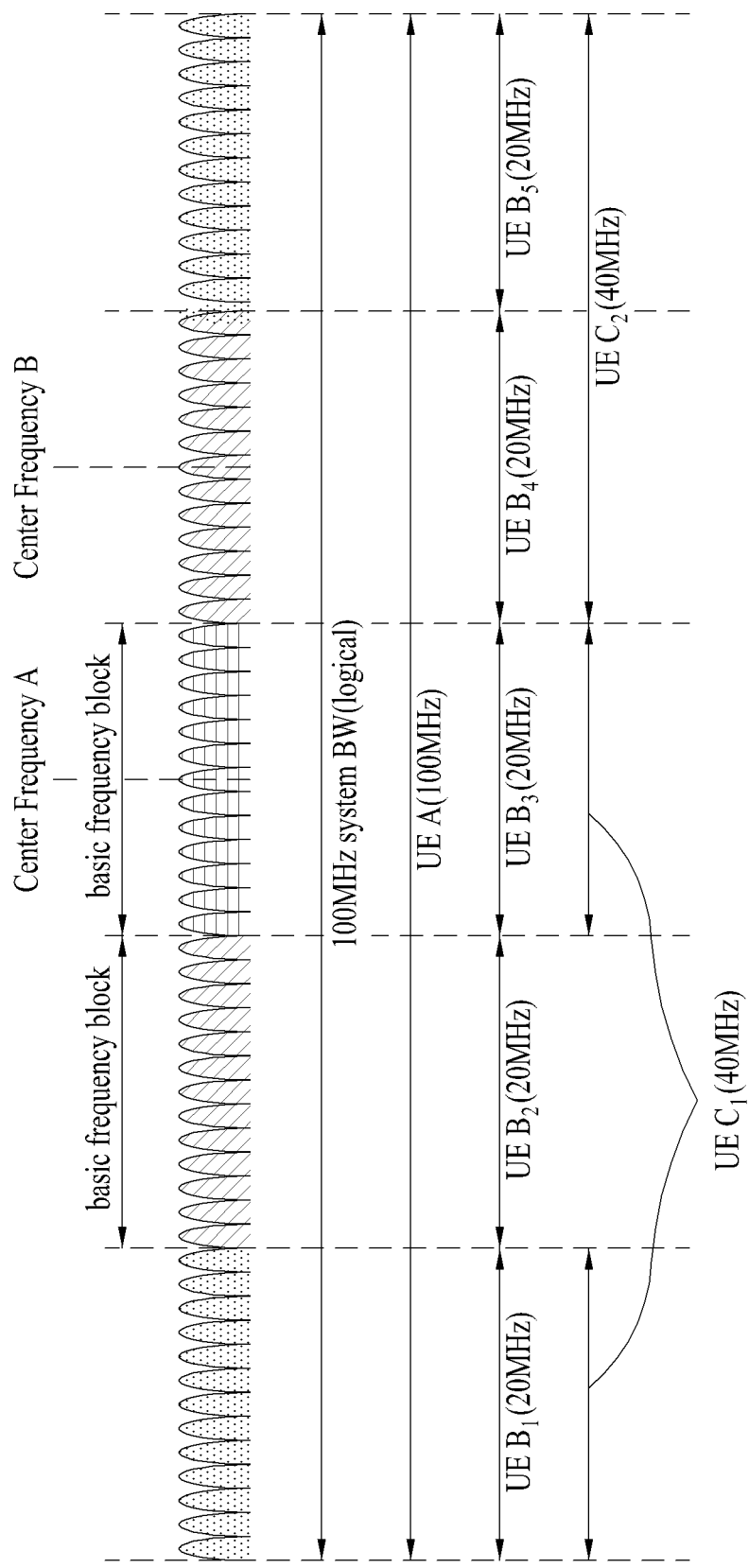
FIG. 7 is a conceptual diagram illustrating a carrier aggregation (CA) scheme.

Carrier aggregation will hereinafter be described in detail. FIG. 7 is a conceptual diagram illustrating carrier aggregation (CA).

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Referring to FIG. 7, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 7, this is only exemplary and the CCs may have different bandwidths. Although the CCs are shown as being contiguous in the frequency domain in FIG. 8, FIG. 8 merely shows the logical concept and thus the CCs may be physically contiguous or separated.

Different center frequencies may be used for the CCs or one common center frequency may be used for physically contiguous CCs. For example, in FIG. 7, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs B1 to B5 may only use a bandwidth of 20 MHz and perform communication using one CC. Each of UEs C1 and C2 may use a bandwidth of 40 MHz and perform communication using two CCs. The two CCs may be contiguous or non-contiguous. The UE C1 uses two non-contiguous CCs and the UE C2 uses two contiguous CCs.

One downlink CC and one uplink CC may be used in the LTE system and several CCs may be used in the LTE-A system. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

Figure 8:
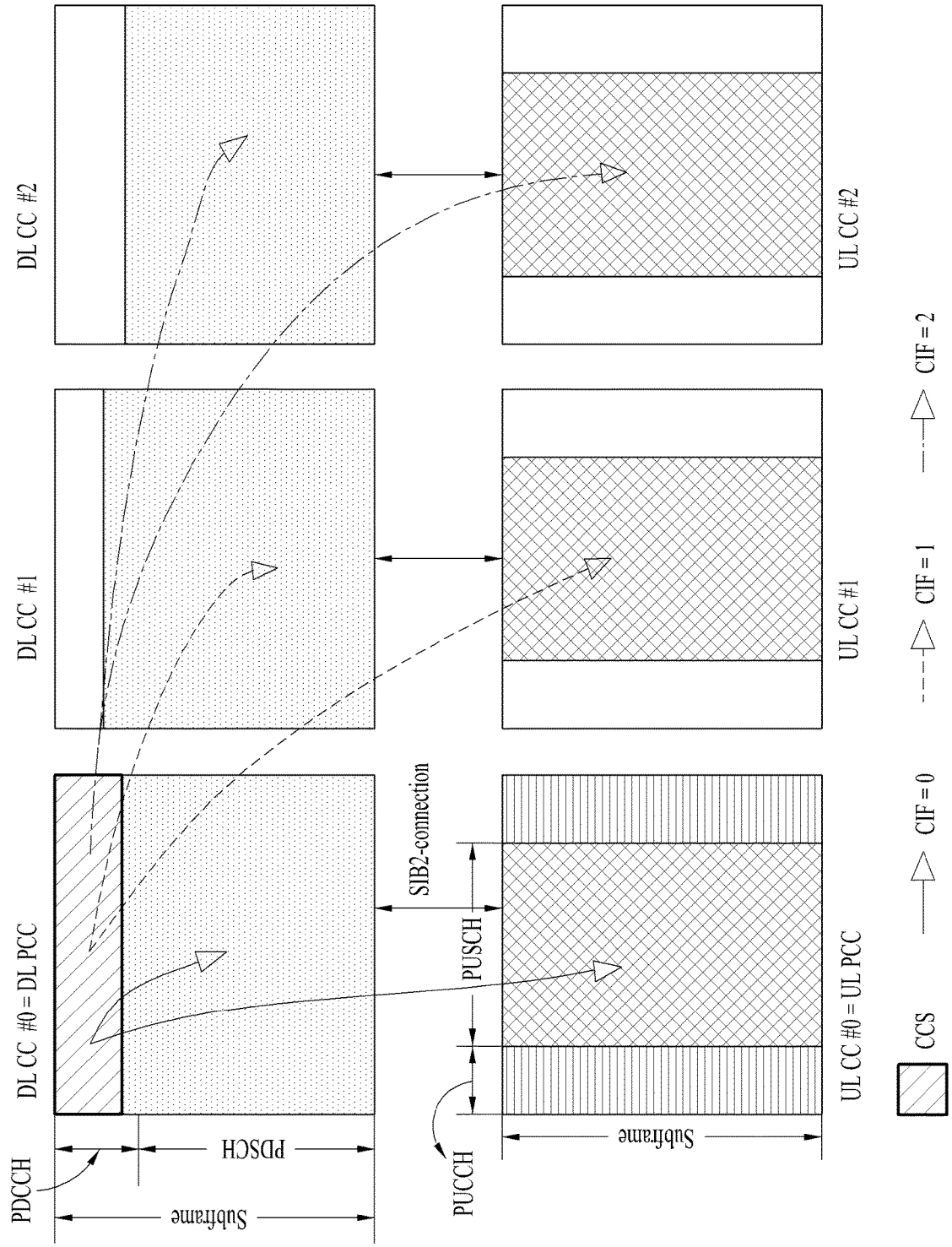
FIG. 8 is a conceptual diagram illustrating a cross-carrier scheduling scheme.

FIG. 8 is a conceptual diagram of a cross carrier scheduling scheme. Specifically, as can be seen from FIG. 8, the number of cells (or CCs) allocated to a relay node (RN) is set to 3, cross carrier scheduling is carried out using a CIF as described above. In this case, it is assumed that a downlink cell (or CC) # A is set to a primary downlink CC (i.e., a primary cell PCell), and the remaining CCs # B and # C are used as secondary cells (SCells).

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

Quasi Co-Located (QCL)

FIG. 9 is a conceptual diagram illustrating a wireless communication system for enabling a UE to receive a Joint Transmission (JT) service from a CoMP set. That is, FIG. 9 shows an example in which the UE is set to a Tx mode of 10.

In FIG. 9, the UE receives data from all transmission points (TPs) belonging to the CoMP set, for example, $TP_1$ and $TP_2$ and may transmit channel state information about all TPs belonging to the CoMP set. In this case, RSs may be transmitted to the UE from a plurality of TPs in the CoMP set. If characteristics for channel estimation with respect to different RS ports of different TPs can be shared, then reception processing load and complexity of the UE may be reduced. In addition, if characteristics for channel estimation with respect to different RS ports of the same TP can be shared by the RS ports, then reception processing load and complexity of the UE may be decreased. Accordingly, an LTE-A system has proposed a method for sharing characteristics for channel estimation between RS ports.

For channel estimation between RS ports, the LTE-A system has introduced the concept of "quasi co-located (QCL)". With regard to two antenna ports, for example, if a large-scale property of a radio channel on which a symbol is transmitted through one of the antenna ports can be inferred from a radio channel on which a symbol is transmitted through the other antenna port, then the two antenna ports can be considered quasi-co-located. The large-scale property includes at least one of delay spread, Doppler spread, Doppler shift, average gain and average delay. The term "quasi co-located" will now be referred to as QCL.

That is, when two antenna ports are QCL, this means that the large-scale property of a radio channel from one antenna port corresponds to the large-scale property of a radio channel from the other antenna port. Considering a plurality of antenna ports through which RSs are transmitted, when antenna ports through which RSs of two different types are transmitted are QCL, the large-scale property of a radio channel from one antenna port may be replaced by the large-scale property of a radio channel from the other antenna port.

According to the concept of quasi-co-location (QCL), the UE cannot assume the same large-scale property for radio channels from non-QCL antenna ports. In this case, the UE needs to perform independent processing per non-QCL antenna port for timing acquisition and tracking, frequency offset estimation and compensation, delay estimation and Doppler estimation, etc.

For antenna ports for which QCL can be assumed, the UE can perform the following operations.

With regard to delay spread and Doppler spread, the UE may equally apply a power-delay-profile, delay spread and Doppler spectrum and Doppler spread estimation result with respect to a radio channel from one antenna port to a Wiener filter used for channel estimation with respect to a radio channel from the other antenna port.

With regard to frequency shift and received timing, the UE may perform time and frequency synchronization for one antenna port and then apply the same synchronization to demodulation with respect to the other antenna port.

For average reception power, the UE may average RSRP (reference signal received power) measurement for two or more antenna ports.

Upon reception of a specific DMRS-based DL-related DCI format through a control channel (PDCCH or ePDCCH), the UE performs channel estimation with respect to a corresponding PDSCH through a DMRS sequence and then performs data demodulation. For example, if the UE can assume QCL between a configuration of antenna ports (referred to as "DMRS ports" hereinafter) for transmission of a DMRS, received through a DL scheduling grant, and a configuration of antenna ports (referred to as "CRS ports" hereinafter) for transmission of a CRS of the DL serving cell of the UE or another cell, then the UE may apply an estimate of the large-scale property of a radio channel, which has been estimated from the CRS ports, to channel estimation through the DMRS ports, thereby improving performance of a processor of a DMRS-based receiver.

Since the CRS is a reference signal that is broadcast with high density per subframe and over the entire band, as described above, the estimate of the large-scale property can be acquired from the CRS more stably. On the contrary, the DMRS is UE-specifically transmitted for a specific scheduled RB and a precoding matrix used by an eNB for transmission may be changed per PRG, and thus a valid channel received by the UE may be changed per PRG. Accordingly, performance deterioration may occur when the DMRS is used to estimate the large-scale property of a radio channel over a wide band even if a plurality of PRGs is scheduled for the UE. The CSI-RS has a transmission period of several to ten ms and is transmitted with as low density as 1 RE (2 REs when CDM is applied) per antenna port per RB. Thus, performance deterioration may occur when the CSI-RS is used to estimate the large-scale property of the radio channel.

That is, QCL assumption between antenna ports may be used for reception of downlink reference signals, channel estimation, channel state reporting, etc.

Semi-Persistent Scheduling (SPS)

SPS (Semi-persistent scheduling) is a scheduling method for reducing overhead of control signaling and efficiently employing resources of a limited control channel. SPS is used when the UE uses time-frequency resources within a predetermined time having a relatively long period. According to SPS, signaling for repeatedly allocating resources within the predetermined time generates signaling overhead, so that time-frequency resources (or region) allocated to the UE can be simultaneously scheduled. Therefore, if time-frequency resources for SPS are allocated to the UE within one subframe, the UE may use the corresponding time-frequency resources without using a separate control channel in the next periodically-repeated SPS-subframe.

SPS may be efficiently used for communication such as VoIP (Voice over Internet Protocol) in which timing or necessary resources can be estimated. RRC and PDCCH may be used as the SPS configuration method. An interval of radio resources being periodically allocated is indicated through RRC, and detailed resource allocation information (transmission attributes such as frequency domain RA or MCS) may be transmitted through PDCCH. SPS may use a special ID such as SPS C-RNTI so that SPS can be distinguished from general dynamic scheduling).

The present invention relates to a method for deciding PDSCH-related parameters including a start symbol of SPS-scheduled PDSCH. In accordance with one embodiment of the present invention, the problems encountered when two or more EPDCCHs are configured in one subframe will hereinafter be described.

As can be seen from the above description, EPDCCH may indicate a PDCCH applied to a legacy PDSCH region so as to increase capacity of a control signal, and it may be possible to obtain a beamforming gain using a UE-specific reference signal (RS). In the case of using EPDCCH, it may be assumed that a start symbol position of PDSCH is identical to the start symbol position of EPDCCH, and the start symbol position of EPDCCH may be transmitted through higher layer signaling such as RRC. However, the start symbol position of PDSCH may be independent of EPDCCH, may be determined according to PCFICH information (e.g., control formation indicator: CFI), or may be set to a predetermined value as necessary.

The eNB may configure EPDCCH or may reconfigure the start symbol position of EPDCCH, and the EPDCCH configuration parameter including the start symbol position of EPDCCH may be transmitted to the UE through higher layer signaling such as RRC. After completion of SPS configuration through PDCCH, the UE may receive the EPDCCH configuration parameter. Alternatively, after reception of the EPDCCH configuration parameter, the UE may perform SPS configuration through PDCCH. As described above, SPS configuration and EPDCCH configuration parameter reception may be achieved simultaneously. In this case, if the SPS-configured subframe corresponds to a subframe needed for EPDCCH monitoring, there is a need to decide the periodic resource region (i.e., the start symbol position of SPS-scheduled PDSCH) scheduled through SPS configuration in the corresponding subframe. The start symbol position of the SPS-scheduled PDSCH may be determined from a PCFICH-indicated value (or a value derived from this indication value), because the PCFICH-indicated value may be different from the start symbol position (or from the position derived from this position) of EPDCCH contained in the EPDCCH configuration parameter received through RRC signaling.

Therefore, if the UE receives the EPDCCH configuration parameter upon completion of SPS configuration, or if the UE performs SPS configuration after reception of the EPDCCH configuration parameter, it may be assumed that the start symbol position (or the position derived from this start symbol position) of EPDCCH contained in the above EPDCCH configuration parameter, prior to the PDSCH start symbol position decided by PCFICH, is the start symbol position of the SPS-scheduled PDSCH. In this case, it is assumed that the start symbol position of the SPS-scheduled PDSCH is identical to the start symbol position of EPDCCH, or is derived from the start symbol position of EPDCCH. Unless the above-mentioned assumption is applied, the eNB may separately perform RRC signaling of the start symbol position of the SPS-scheduled PDSCH, and the UE having received the corresponding information may have priority over PCFICH information.

However, under the condition that the UE may receive the EPDCCH configuration parameter including the PDSCH start symbol position after completion of SPS configuration, or under the condition that SPS configuration is achieved after reception of the EPDCCH configuration parameter including the PDSCH start symbol position, if the SPS-scheduled subframe does not correspond to a subframe needed for EPDCCH monitoring, the start symbol position of the SPS-scheduled PDSCH may be based on PCFICH. The reason why the above-mentioned assumption is achieved is that EPDCCH monitoring can be configured only in some subframes.

FIG. 10 is a conceptual diagram illustrating a method for deciding the start symbol position of the SPS-scheduled PDSCH (hereinafter referred to as SPS-PDSCH) according to the above-mentioned embodiment. In FIG. 10, the SPS-configured UE may receive the EPDCCH configuration parameter including the EPDCCH start symbol position through RRC signaling, and the corresponding position (symbol n1) is different from the PCFICH-indicated value (symbol n0). The start symbol position of SPS-PDSCH is based on RRC signaled information, simultaneously while having priority over the PCFICH-indicated information, so that "symbol n1" may be decided.

A method for deciding the start symbol position of SPS-PDSCH is a common promise between the eNB and the UE. In a specific situation having a controversial issue, i.e., in a subframe in which SPS is configured and the UE has to monitor EPDCCH, the eNB must schedule or transmit the SPS-PDSCH from the beginning of the start symbol of EPDCCH, and the UE must decode the SPS-PDSCH from the beginning of the start symbol position of EPDCCH.

In the meantime, the eNB can transmit two or more EPDCCH configuration parameters to the UE. In this case, each EPDCCH configuration parameter may include the start symbol position of each EPDCCH, and may be transmitted to the UE through higher layer signaling such as RRC signaling. If the start symbol positions of EPDCCH contained in at least two EPDCCH configuration parameters are identical to each other, the UE may determine the start symbol position of the RRC-signaled EPDCCH to be the start symbol position of SPS-PDSCH. However, the start symbol positions of individual EPDCCHs contained in at least two EPDCCH configuration parameters may be different from each other. In this case, there occurs an unexpected problem in which the start symbol position of SPS-PDSCH needs to be determined. Therefore, the UE may assume that a higher one from among the respective EPDCCH start symbol positions (i.e., a higher OFDM symbol index from among the individual EPDCCH start symbol positions) is the start symbol position of SPS-PDSCH. Specifically, if individual EPDCCHs are transmitted from different TPS as in dynamic point scheduling (DPS), and if each TP will be configured not to use several initial OFDM symbols in consideration of an interference environment, the start symbol position of SPS-PDSCH can be conservatively configured, so that the influence of inter-cell interference can be minimized.

Figure 11:
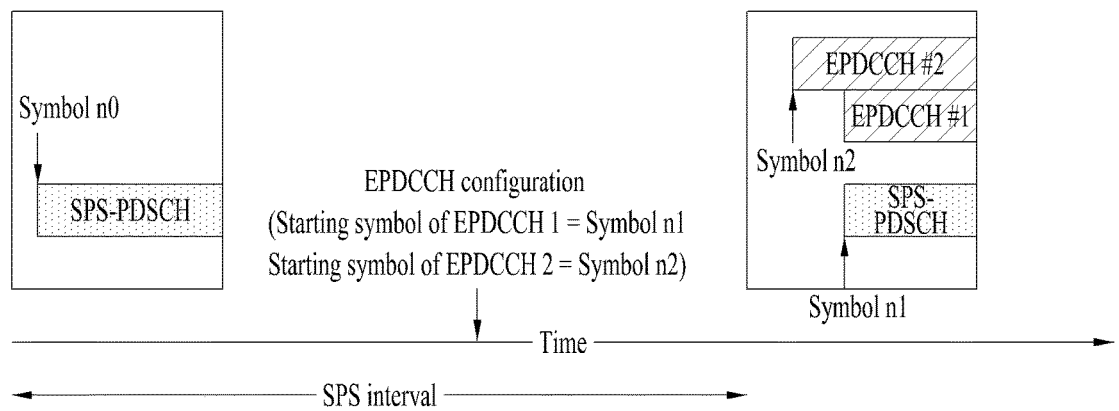
FIG. 11 is a conceptual diagram illustrating invention method for deciding the start symbol position of SPS-PDSCH when the SPS-configured UE receives at least two EPDCCH-related parameters.

FIG. 11 is a conceptual diagram illustrating a method for deciding the start symbol position of SPS-PDSCH when the SPS-configured UE receives at least two EPDCCH-related parameters. If the start symbol position of EPDCCH #1 is Symbol n1 and the start symbol position of EPDCCH #2 is Symbol n2, max(n1, n2) may indicate the start symbol position of SPS-PDSCH. In FIG. 2, the situation of n1≥n2 is assumed so that the start symbol position of SPS-PDSCH may be set to n1.

When at least two different EPDCCH configuration parameters (i.e., at least two EPDCCH start symbol positions) are signaled to the UE, a smaller one from among the individual EPDCCH start symbol positions may be set to the start symbol position of SPS-PDSCH according to another method for deciding the start symbol position of SPS-PDSCH. In still another method, in a specific situation having a controversial issue, a predetermined position may be set to the SPS-PDSCH start symbol position, or the SPS-PDSCH start symbol position may be separately signaled to the UE through separate RRC signaling or the like. In another method, a representative EPDCCH from among two or more EPDCCHs may be configured, and the start symbol position of the representative EPDCCH may be set to the SPS-PDSCH start symbol position. In accordance with the method for deciding the representative EPDCCH, a first signaling one from among EPDCCHs may be set to a representative one.

In accordance with another scheme, a method for deciding the start symbol position of SPS-PDSCH in a subframe for detecting EPDCCH (i.e., in a subframe in which the UE has to monitor an EPDCCH) may be determined according to categories of a control channel needed for SPS-PDSCH scheduling. For example, assuming that the corresponding SPS is scheduled using EPDCCH, the EPDCCH set including the corresponding scheduling EPDCCH may be determined to be a representative EPDCCH set. In this case, whereas the EPDCCH start symbol position is determined to be the SPS-PDSCH start symbol position in the EPDCCH detection subframe, and if the corresponding SPS is scheduled by PDCCH, a higher one from among the start symbol positions of two EPDCCH sets may be selected, or a first one from among the EPDCCH set may be set to a representative one, so that the SPS-PDSCH start symbol position in the EPDCCH detection subframe may be determined. In the meantime, the method for deciding the start symbol position may be restrictively applied only when there is no explicit indicator for the SPS-PDSCH start symbol position.

A more general embodiment of the above-mentioned embodiment will hereinafter be described. If two or more EPDCCHs are configured in UE, the start symbol positions of individual EPDCCHs may be different from each other as previously stated above. Meanwhile, individual EPDCCHs may be transmitted from different TPs. In this case, individual EPDCCHs (or PDSCHs scheduled by the corresponding EPDCCH) may have different PDSCH start symbol positions, different rate matching patterns (or PDSCH RE mapping patterns) related to a specific RS (e.g., DM-RS, CRS or CSI-RS), different antenna port configurations (e.g., DM-RS antenna port configurations used in EPDCCH/PDSCH decoding), different seeds of the pseudo random sequence used to generate the RS (e.g., DM-RS) sequence, and/or different scrambling IDs.

Therefore, in case of the SPS-configured UE, the start symbol position of SPS-PDSCH and the above-mentioned parameters applied to SPS-PDSCH should be determined. The UE may receive information regarding two or more applicable parameter sets (i.e., several candidate parameter sets) through higher layer signaling such as RRC signaling.

A) UE may assume that the CRS pattern of the serving cell is always applied to SPS-PDSCH, and DM-RS used for SPS-PDSCH (or EPDCCH) decoding is QCL-processed with the CRS of the serving cell.

B) A set of actually applied parameters from among parameter sets applicable to SPS-PDSCH may be signaled to the UE through higher layer signaling such as RRC signaling. The UE having received the above set may assume that the RRC-signaled parameter sets are applied to SPS-PDSCH. Specifically, the corresponding signaling may be transmitted while simultaneously performing SPS scheduling (SPS configuration).

C) Parameters applied to SPS-PDSCH may always be based on the serving cell as described in the above section (A), and may also be based on a control channel scheduling the corresponding SPS. In other words, assuming that SPS is scheduled through a specific control channel at a specific time, parameters to be applied to SPS-PDSCH may be based on parameters having been applied to transmission of the above specific control channel, prior to execution of SPS configuration due to transmission of still another control channel. For example, assuming SPS scheduling is achieved through PDCCH, the scheduling result may be based on parameters of PDCCH (i.e., parameters of the serving cell). When SPS scheduling is achieved through EPDCCH, the scheduling result may be based on parameters used for transmission of the corresponding EPDCCH.

D) Parameters applied to SPS-PDSCH may be designated through a control channel having scheduled the corresponding SPS. In other words, assuming that SPS is scheduled through a specific control channel at a specific time, parameters to be applied to SPS-PDSCH may be based on parameters indicated through the above specific control channel, before SPS-PDSCH is scheduled after transmission of another control channel. Differently from the above method (C), parameters used for the above specific control channel may be different from parameters indicated by an indicator transmitted over the above specific control channel. For example, assuming that execution of rate matching is indicated according to the CRS pattern of an adjacent cell through a PDCCH transmitted using the CRS parameter of the serving cell, the next SPS-PDSCH needs to be rate-matched according to the CRS pattern of the indicated adjacent cell, as can be seen from the above method (D).

E) If two or more EPDCCHs are configured, it may be assumed that parameters applied to SPS-PDSCH are based on a specific EPDCCH from among the corresponding EPDCCHs. For example, if the UE receives two or more EPDCCH configuration parameters through RRC signaling, parameters applied to SPS-PDSCH may always be based on configuration parameters of a first EPDCCH.

F) Parameters applied to SPS-PDSCH may be predetermined as necessary. In this case, the corresponding parameters may be different from those of EPDCCH. Specifically, this scheme can be used, irrespective of whether a channel having scheduled the corresponding SPS-PDSCH is a PDCCH or an EPDCCH.

G) Parameters applied to SPS-PDSCH may be based on parameters of a dynamic PDSCH. The dynamic PDSCH may be a PDSCH capable of being transmitted using at least two different parameter sets, and information as to which parameter set has been applied to a specific PDSCH may be contained in a DCI detected from PDCCH or EPDCCH, so that this information may be transmitted to the UE through DCI. Therefore, the UE may recognize parameters applied to the dynamic PDSCH by interpreting DCI, and a specific rule may be assumed between the UE and the eNB. This specific rule indicates that parameters applied to SPS-PDSCH are identical to those of the dynamic PDSCH.

Information related to the above operation may be implicitly recognized according to a predetermined rule, or the eNB may inform the UE of this information through predefined signaling (e.g., higher layer signaling or physical layer signaling). In addition, different schemes may be applied according to the scheduling message categories (e.g., DCI format) for SPS scheduling. Specifically, according to the presence or absence of information as to whether the indicator indicating parameters applied to PDSCH is present in the scheduling message, different operation schemes may be used.

For example, if SPS scheduling is performed using the scheduling message having the above indicator, the above method (D) may be used. On the contrary, if the scheduling message having no indicator is used, the above methods A), B) and C) may be used.

In addition, some of various parameters applied to PDSCH may be determined according to different schemes. For example, the SPS-PDSCH start symbol may use a control channel for scheduling the SPS according to the above method (C), CRS to be assumed in the rate matching may use the CRS of the serving cell according to the above method (A), and CSI-RS to be assumed in the rate matching may use a series of parameters pre-signaled by RRC according to the above method (B). Specifically, the above-mentioned operations may be efficiently used when the explicit indicator is not present in the parameters related to the SPS scheduling message.

In more detail, the method for deciding parameters applied to SPS-PDSCH based on the method (D) is used in a subframe corresponding to DCI format 2D. In a subframe corresponding to DCI format 0 or 1A, a method for deciding parameters applied to SPS-PDSCH based on the method (B) is used.

In the meantime, when deciding the start symbol position of SPS-PDSCH, the SPS-PDSCH start symbol position must be limited to Symbol #2 in a subframe in which the PDSCH start symbol index is set to a maximum of 2 in the same manner as in the MBSFN subframe. For example, assuming that a higher one of the start symbol positions of EPDCCH configured through RRC signaling is set to the start symbol position of SPS-PDSCH, if the higher one is higher than 2, the corresponding value is used. If the higher one is not higher than 2 (i.e., if the higher one is less than 2), it is assumed that the symbol is Symbol #2.

The above-mentioned assumption can be applied not only to the case in which a higher one from among the start symbol positions of EPDCCH is set to the SPS-PDSCH start symbol position, but also to the above-mentioned methods, i.e., a PCFICH-based method, a method based on a smaller one from among the EPDCCH start symbol positions, or a method based on the start symbol position of a representative EPDCCH.

Some of the above-mentioned methods will be shown in the following table, and as such a detailed description thereof will be given below. Before or after SPS configuration is completed, if the UE does not receive the EPDCCH configuration parameter including the EPDCCH start symbol position information (i.e., if CCH configuration is not present), it is assumed that a value indicated by PCFICH is set to the SPS-PDSCH start symbol position (index), as can be seen from '1' in the following Table. If SPS configuration is achieved before or after reception of the EPDCCH start symbol position information, it is assumed that the EPDCCH start symbol position is set to the start symbol position (as denoted by "2" in the following table). If at least two EPDCCH start symbol positions are different from each other, a higher one from among the at least two EPDCCH start symbol positions may be set to the SPS-PDSCH start symbol position (as denoted by "3" in the following table). In the case of the MBSFN subframe, if at least two EPDCCH start symbol positions are received, a higher one from among the at least two EPDCCH start symbols is used. If the corresponding value is less than 2, it is assumed that the SPS-PDSCH start symbol position is set to Symbol #2 (4).

TABLE 5

|  | 1 | 2 | 3 | 4 |
|---|---|---|---|---|
| PDSCH Starting symbol position indicated by PCFICH | N0 | N0 | N0 | N0 |
| Starting symbol position of EPDCCH #1 | — | N1 | N1 | N1 |
| Starting symbol position of EPDCCH #2 | — | — | N2 | N2 |
| Starting symbol position of SPS-scheduled PDSCH | N0 | N1 | If N1 >= N2, N1 If N1 < N2, N2 | If N1 >= N2 & N1 > 2, N1 If N1 < N2 & N2 > 2, N2 Otherwise, 2 |

The above-mentioned operations may be selectively applied according to subframe configuration. For example, in the case of the MBSFN subframe, since SPS-PDSCH is transmitted on the basis of DM-RS, the SPS-PDSCH start symbol position or information (CRS, CSI-RS, etc.) to be assumed in the rate matching can be obtained using one of the methods based on the DMRS-based EPDCCH configuration parameter. On the contrary, in the case of the non-MBSFN subframe, SPS-PDSCH may be transmitted on the basis of CRS. In this case, the SPS-PDSCH start symbol position may be derived from PCFICH of the serving cell, or the rate matching is not assumed for CRS of a neighbor cell. Even in the case of the non-MBSFN subframe, if SPS-PDSCH is transmitted on the basis of DM-RS, one of the above-mentioned methods may also be used on the basis of the DMRS-based EPDCCH configuration parameters.

The above-mentioned embodiments may also assume that the EPDCCH start symbol does not overlap with the PDCCH transmission region. If the above assumption is not present, the start symbol positions of EPDCCHs and the PDSCH start symbol position derived by the indicator transmitted by PCFICH may be simultaneously considered in the process for deciding the start symbol position of SPS-PDSCH. For example, according to case "3" shown in Table 5, if the PDSCH start symbol index derived by PCFICH is higher than the start symbol index of EPDCCHs, the value derived by PCFICH may be set to the SPS-PDSCH start symbol position.

In the meantime, if CA (Carrier Aggregation) is configured, the UE may simultaneously monitor a PDCCH and an EPDCCH at a specific subframe. For example, in the case of the UE in which cross carrier scheduling (CCS) is configured, PDSCH of PCell of the corresponding UE is scheduled by EPDCCH transmitted to PCell. PDSCH of SCell may be CCS-processed by PDCCH transmitted to PCell. In this case, the following method may be used to determine the PDSCH start symbol position of PCell.

a) Method for assuming the start symbol position of EPDCCH

In accordance with a method for assuming the corresponding subframe to be a subframe which has to monitor the EPDCCH, since PDSCH of PCell is scheduled by EPDCCH, this means that the scheduling result may follow the start symbol position of a scheduling channel.

b) Method for assuming the start symbol position derived by PCFICH

In accordance with the method (b), the corresponding subframe is considered to be a subframe which monitors UE-specific Search Space (USS) at PDCCH. Specifically, if the EPDCCH start symbol position is RRC-signaled and configured and does not overlap with the PDCCH region, the start symbol position derived by PCFICH may be identical to or less than the start symbol index of EPDCCH, resources can be more efficiently used, resulting in higher efficiency in terms of resource utilization.

In the case in which there is no explicit indicator regarding the PDSCH start symbol position of PCell in PDSCH scheduling of PCell, the above-mentioned situation may be efficiently used. Besides the above-mentioned methods, if the above indicator is present, the start symbol position indicated by the above indicator may be determined to be the PDSCH start symbol position of PCell. Specifically, even in the case of PDSCH of SCell, PDSCH scheduling of the corresponding SCell includes the explicit indicator, a value indicated by the above indicator may be determined to be the PDSCH start symbol position of SCell, while simultaneously having priority over a predetermined start symbol position being semi-persistently decided by RRC signaling.

In this case, it is assumed that EPDCCH configuration parameters having the EPDCCH start symbol position may be configured through higher layer signaling, or may be set to predetermined values. If higher layer signaling is not present, the EPDCCH start symbol position may be derived from PCFICH.

In the meantime, the CCS-configured UE may be SPS activated through EPDCCH of PCell, so that it may receive the SPS-PDSCH scheduling result of PCell. In a case in which the above-mentioned CC is not configured, the method for deciding the SPS-PDSCH start symbol position and various SPS-PDSCH parameters may be applied without change. However, in the case of the SPS-PDSCH start symbol position of PCell, the UE may monitor a PDCCH even in the subframe needed for EPDCCH monitoring, due to the presence of CCS regarding the SCell. As a result, another scheme for satisfying the start symbol position derived from PCFICH instead of the EPDCCH start symbol position may also be used.

In the meantime, if PDSCH of SCell is CCS-processed by PDCCH or EPDCCH applied to PCell, the PDSCH start symbol of SCell may be determined as follows.

a') The above-mentioned PDSCH start symbol of SCell may satisfy a PDSCH start symbol position of SCell signaled by RRC.

b') If the explicit indicator for the PDSCH start symbol position of SCell is contained in the PDSCH scheduling message of SCell transmitted in PDCCH/EPDCCH, the UE may be based on the start symbol position indicated by the above indicator. This method (b') is irrelevant to information as to whether the above scheduling message is transmitted over PDCCH or EPDCCH.

c') If the explicit indicator regarding the PDSCH start symbol of SCell is not contained in the PDSCH scheduling of SCell transmitted in PDCCH/EPDCCH, the PDSCH start symbol position of SCell and/or a parameter to be applied to PDSCH of SCell may be determined using any one of the above-mentioned methods (A) to (G). However, since the PDSCH start symbol position of the RRC-configured SCell is present, the start symbol position indicated by the corresponding RRC may be used as necessary.

Figure 12:
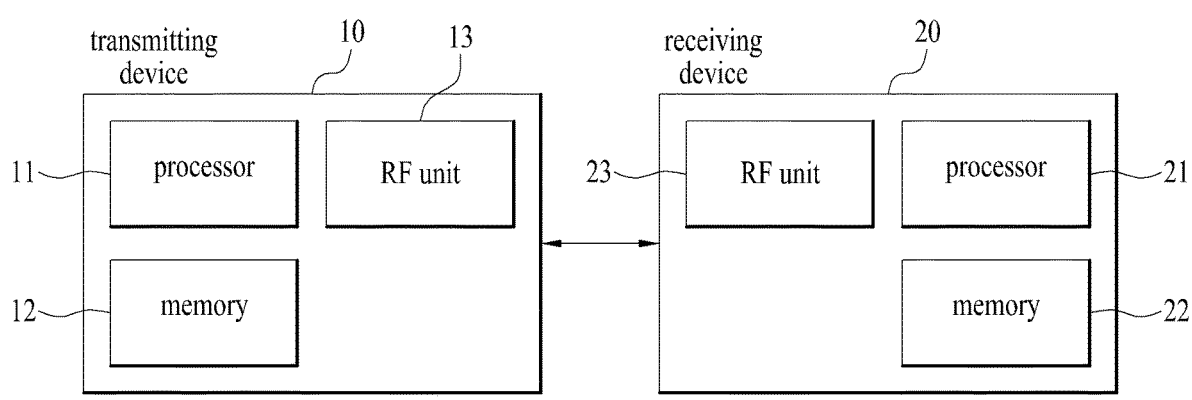
FIG. 12 is a block diagram of an apparatus for implementing embodiment(s) of the present invention.

FIG. 12 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a relay and a base station (BS).

The invention claimed is:

1. A method for a user equipment (UE) in a wireless communication system, comprising:
obtaining a plurality of parameter sets for a Semi Persistent Scheduling (SPS)-physical downlink shared channel (PDSCH) through higher layer signaling;
receiving a downlink control information (DCI), wherein the DCI comprises information on the SPS-PDSCH;
determining a starting symbol position of the SPS-PDSCH based on a parameter set among the plurality of parameter sets;
based on that the DCI is a first DCI format including an indicator, decoding the SPS-PDSCH using a parameter set indicated by the indicator from among the plurality of parameter sets; and
based on that the DCI is a second DCI format not including the indicator, decoding the SPS-PDSCH using a predetermined parameter set from among the plurality of parameter sets,
wherein each of the plurality of parameter sets includes information regarding the starting symbol position of the SPS-PDSCH.

2. The method according to claim 1,
wherein the DCI is received through an enhanced physical downlink control channel (EPDCCH), and
wherein the starting symbol position of the SPS-PDSCH is different from a starting symbol position of the EPDCCH.

3. The method according to claim 1, wherein the UE is scheduled to receive two or more EPDCCHs in a subframe.

4. The method according to claim 3, wherein the two or more EPDCCHs are transmitted from different transmission points or different evolved Node B.

5. The method according to claim 1, wherein each of the plurality of parameter sets includes resource element (RE) mapping pattern information related to specific reference signal(s).

6. The method according to claim 1, wherein:
if the SPS-PDSCH is received in a MBSFN (Multimedia Broadcast multicast service Single Frequency Network) subframe, the starting symbol position of the SPS-PDSCH is restricted to a starting symbol position of a downlink data channel of the MBSFN subframe.

7. The method according to claim 1, wherein the user equipment (UE) is configured in transmission mode 10.

8. The method according to claim 1, wherein the determined parameter set is used for decoding the SPS-PDSCH until receiving a new DCI configuring SPS.

9. The method according to claim 1, the DCI is received through an EPDCCH.

10. A method for a user equipment (UE) in a wireless communication system, performed by an eNodeB (evolved Node B) and comprising:
transmitting a plurality of parameter sets for a Semi Persistent Scheduling (SPS)-physical downlink shared channel (PDSCH) through higher layer signaling; and
transmitting a downlink control information (DCI), wherein the DCI comprises information on the SPS-PDSCH,
wherein based on that the DCI is a first DCI format including an indicator, a parameter set indicated by the indicator from the plurality of parameter sets is used for the UE to decode the SPS-PDSCH, and
wherein based on that the DCI is a second DCI format not including the indicator, a predetermined parameter set from among the plurality of parameter sets is used for the UE to decode the SPS-PDSCH, and
wherein a parameter set among the plurality of parameter sets is used for the UE to determine a starting symbol position of the SPS-PDSCH, and
wherein each of the plurality of parameter sets includes information regarding the starting symbol position of the SPS-PDSCH.

11. The method according to claim 10, wherein the DCI is transmitted through an enhanced physical downlink control channel (EPDCCH), and
wherein the starting symbol position of the SPS-PDSCH is different from a starting symbol position of the EPDCCH.

12. The method according to claim 10, wherein the UE is scheduled to receive two or more EPDCCHs in a subframe.

13. The method according to claim 12, wherein the two or more EPDCCHs are transmitted from different transmission points or different eNodeB.

14. The method according to claim 10, wherein each of the plurality of parameter sets includes resource element (RE) mapping pattern information related to specific reference signal(s).

15. The method according to claim 10, wherein:
if the SPS-PDSCH is transmitted in a MBSFN (Multimedia Broadcast multicast service Single Frequency Network) subframe, the starting symbol position of the SPS-PDSCH is restricted to a starting symbol position of a downlink data channel of the MBSFN subframe.

16. The method according to claim 10, wherein the user equipment (UE) is configured in transmission mode 10.

17. The method according to claim 10, wherein the determined parameter set is used for decoding the SPS-PDSCH until receiving a new DCI configuring SPS.

18. The method according to claim 10, the DCI is transmitted through an EPDCCH.

19. A user equipment (UE) for a wireless communication system, comprising:
   a radio frequency (RF) unit; and
   a processor that controls the RF unit,
   wherein the processor is configured to:
   obtain a plurality of parameter sets for a Semi Persistent Scheduling (SPS)-physical downlink shared channel (PDSCH) through higher layer signaling,
   receive a downlink control information (DCI), wherein the DCI comprises information on the SPS-PDSCH,
   determine a starting symbol position of the SPS-PDSCH based on a parameter set among the plurality of parameter sets,
   based on that the DCI is a first DCI format including an indicator, decode the SPS-PDSCH using a parameter set indicated by the indicator from among the plurality of parameter sets, and
   based on that the DCI is a second DCI format not including the indicator, decode the SPS-PDSCH using a predetermined parameter set from among the plurality of parameter sets,
   wherein each of the plurality of parameter sets includes information regarding the starting symbol position of the SPS-PDSCH.

20. An evolved Node B (eNB) for a wireless communication system, comprising:
   a radio frequency (RF) unit; and
   a processor that controls the RF unit,
   wherein the processor is configured to:
   transmit a plurality of parameter sets for a Semi Persistent Scheduling (SPS)-physical downlink shared channel (PDSCH) through higher layer signaling; and
   transmit a downlink control information (DCI), wherein the DCI comprises information on the SPS-PDSCH,
   wherein based on that the DCI is a first DCI format including an indicator, a parameter set indicated by the indicator from the plurality of parameter sets is used for the UE to decode the SPS-PDSCH, and
   wherein based on that the DCI is a second DCI format not including the indicator, a predetermined parameter set from among the plurality of parameter sets is used for the UE to decode the SPS-PDSCH, and
   wherein a parameter set among the plurality of parameter sets is used for the UE to determine a starting symbol position of the SPS-PDSCH, and
   wherein each of the plurality of parameter sets includes information regarding a starting symbol position of the SPS-PDSCH.

* * * * *